United States Patent
Prater et al.

(10) Patent No.: US 6,470,570 B2
(45) Date of Patent: Oct. 29, 2002

(54) METHOD FOR MAKING A TUBE FOR A HEAT EXCHANGER HAVING A FIN INSERT WITH TRANSVERSE CONVOLUTIONS

(75) Inventors: Larry P. Prater, Taylor, MI (US); Richard P. Stoynoff, Woodhaven, MI (US)

(73) Assignee: Livernois Engineering Co., Dearborn, MI (US)

( * ) Notice: Subject to any disclaimer, the term of this patent is extended or adjusted under 35 U.S.C. 154(b) by 0 days.

(21) Appl. No.: 09/901,924

(22) Filed: Jul. 10, 2001

(65) Prior Publication Data

US 2001/0037559 A1 Nov. 8, 2001

Related U.S. Application Data

(63) Continuation of application No. 09/213,963, filed on Dec. 17, 1998, now Pat. No. 6,286,201.

(51) Int. Cl.⁷ .............................................. B23P 15/26
(52) U.S. Cl. ........................ 29/890.053; 29/890.049; 29/890.054
(58) Field of Search .................... 29/890.053, 890.054, 29/727, 890.049

(56) References Cited

U.S. PATENT DOCUMENTS

| | | | | | |
|---|---|---|---|---|---|
| 4,595,135 | A | * | 6/1986 | Wallis | 228/17 |
| 4,971,240 | A | * | 11/1990 | Wallis | 219/61.2 |
| 4,998,580 | A | * | 3/1991 | Guntly et al. | 165/133 |
| 5,099,576 | A | * | 3/1992 | Shinmura | 165/153 |
| 5,271,151 | A | * | 12/1993 | Wallis | 29/890.053 |
| 5,372,188 | A | * | 12/1994 | Dudley et al. | 165/110 |
| 5,456,006 | A | * | 10/1995 | Study | 29/890.049 |
| 5,656,332 | A | * | 8/1997 | Saito et al. | 118/324 |
| 5,771,964 | A | * | 6/1998 | Bae | 165/144 |
| 6,016,864 | A | * | 1/2000 | Bae et al. | 165/144 |

* cited by examiner

Primary Examiner—I Cuda-Rosenbaum
(74) Attorney, Agent, or Firm—Brooks & Kushman P.C.

(57) ABSTRACT

An apparatus and method for making a heat exchanger tube (14) for a heat exchanger (10) in which a continuous insert (26), having convolutes transverse to the length of the tube are located into a continuous shell as the shell is being formed. After placing the insert (26) into the partially open shell, the shell is closed and sealed as it passes through a bonding device (64) to seal the longitudinal edges of the shell to each other and the insert to the internal walls of the tube. The continuous shell with the inserted fin insert is subsequently sliced to produce individual cooling tubes.

5 Claims, 6 Drawing Sheets

METHOD FOR MAKING A TUBE FOR A HEAT EXCHANGER HAVING A FIN INSERT WITH TRANSVERSE CONVOLUTIONS

This is a continuation application Ser. No. 09/213,963 filed on Dec. 17, 1998, now U.S. Pat. No. 6,286,201.

TECHNICAL FIELD

The invention is related to an apparatus and method for making tubes for a heat exchanger and in particular to tubes having a convoluted fin insert in which the convolutions are transverse to the length of the tube.

BACKGROUND ART

The use of cooling tubes in heat exchangers having rectangular or oblong cross-sections such as taught by Wallis in U.S. Pat. Nos. 4,595,135 and 4,971,240 are well known in the art. More recently, Wallis in U.S. Pat. No. 5,271,151 discloses the formation of a plurality of parallel longitudinal flow paths within an oblong cooling tube. Alternatively, Dudley in U.S. Pat. No. 5,372,188 and Guntly in U.S. Pat. No. 4,998,580 disclose the use of inserts convoluted in a direction parallel to the length of the cooling tube to form the plurality of parallel longitudinal fluid flow paths called turbulators within the cooling tubes, while Study in U.S. Pat. No. 5,456,006 describes a method for inserting a turbulator into the cooling tube during the formation of the cooling tube. In the above cooling tubes the turbulators form small longitudinal flow paths extending parallel to the length of the cooling tube. This configuration is well adapted to charge air coolers.

In an alternate configuration of the cooling tube, Bae in U.S. Pat. No. 5,771,964 teaches a cooling tube in which small fluid flow channels are provided transverse to the length of the cooling tube. This type of geometry produces a more efficient heat exchanger.

Against this background, the need has arisen for cost-effective manufacture of extruded tubes used in heat exchanging, i.e., condensing, applications. One requirement for instance, of refrigeration condensers is to supply the largest surface area to the compressed gases and be able to contain high internal (and often varying) pressures without distortion or leak.

DISCLOSURE OF INVENTION

The invention is an apparatus and method for inserting a high-density insert such as a fin, into a tube having an oblong cross-section as the tube is being formed. The high-density insert in cooperation with the internal surfaces of the tube forms a plurality of transverse fluid paths.

The disclosed invention includes the utilization of a high density insert, having convolution counts well above the normal thirty convolutions per inch. Such an insert provides enhanced surfaces required for superior heat transfer characteristics. The disclosed insert is bonded to the inside of a heat transfer tube, wherein it offers a long, tortuous path which is conducive to efficiency of heat transfer. The enhanced insert may or may not have any louvers, as is customary in air side fins conventionally manufactured.

The disclosed structure provides a high internal strength which retains high pressure. Strength is provided by bonding the insert to the interior surface of flattened oval tubes. The disclosed sinusoidal insert supports internal forces that define a truss-type form, thereby presenting a stiff construction. If brazed, the form of the convolutions after they are compressed, defines cavities which a molten clad fills, thereby forming a fillet bond.

An apparatus and for making a tube for a heat exchanger includes a first set of rollers to form a continuous longitudinal shell from a metal strip, and inserting a continuous insert into the shell as the shell becomes closed. The insert has high density convolutes transverse to the length of the continuous shell. Optionally, the insert is supported within the shell by a series of dimples. The continuous shell with the insert is closed, and then bonded to seal the open edges of the strip to each other as it passes through a bonding device (preferably an induction heater). The method concludes with the slicing the sealed continuous tube into individual segments to produce desired lengths of cooling tubes.

An object of the invention is to make a tube for a heat exchanger including an insert having high density of convolutions transverse to its length.

Another object of the invention is the addition of dimples in the outer shell to locate (preferably centrally) and support the insert inside the finished tube.

Still another object of the invention is to provide detents in the outer shell from blocking the fluid channels formed in the sealed shell on opposite sides of the insert to form a serpentine fluid path through the cooling tube.

Another object of the invention is a method for making a tube in which the insert is loaded into the shell as the tube is being formed.

Still another object is to provide a cooling tube having superior heat transfer properties.

Yet another object is to manufacture a cooling tube with a high density convoluted insert having convolutes transverse to the length of the tube.

A further advantage of the invention is that it is a cost efficient way to fabricate uniform cooling tubes for heat exchangers having an internal insert.

These and other advantages of the invention will become more apparent from a reading of the Specification in conjunction with the drawings.

BEST MODES FOR CARRYING OUT THE INVENTION

Figures 1, 2:
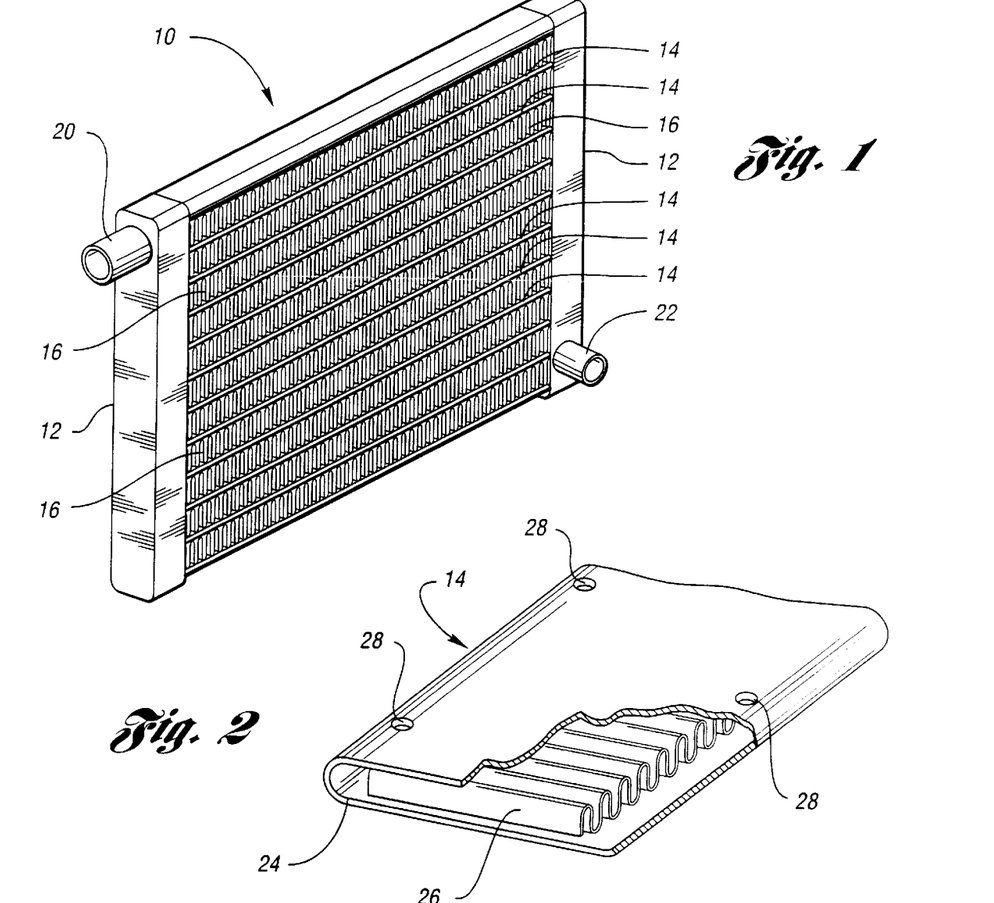
FIG. 1 is a perspective view of a heat exchanger incorporating tubes made according to the invention.
FIG. 2 is a perspective view of the tube showing the fin insert.

The invention is an apparatus and method for making tubes for a heat exchanger 10 of the type shown in FIG. 1. The heat exchanger 10 has a pair of spatially separated manifolds or headers 12 interconnected by a plurality of tubes 14. The tubes 14 may be arranged in a single row tubes or two or more rows of cooling tubes as is known in the art. Preferably, cooling fins 16 are provided between adjacent cooling tubes to enhance the heat exchange between the cooling tubes and an external atmosphere, such as air. The heat exchanger will normally have an inlet connector 20 attached to one of the headers 12 and an outlet connector 22 attached to the opposite header 12.

Figure 3:
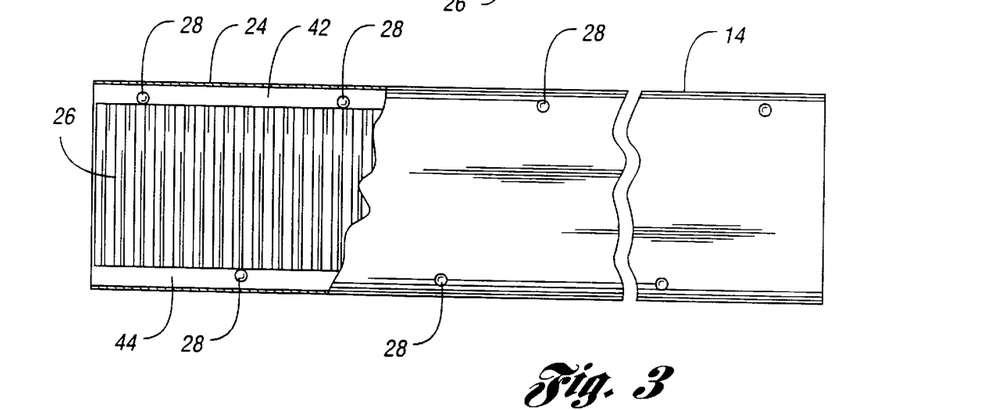
FIG. 3 is a partially cut away perspective view of a tube showing the convolutes of the fin insert.
Figures 12, 13, 14:
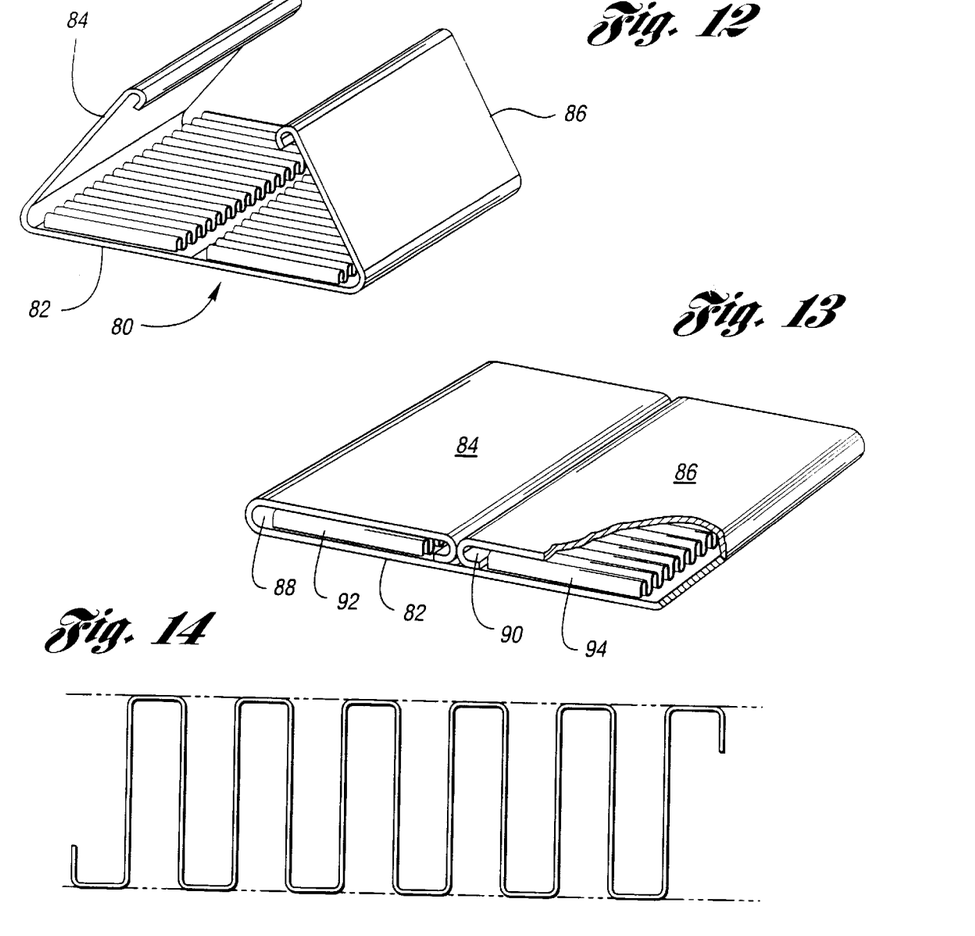
FIG. 12 is a perspective view of a partially open alternate embodiment of the tube.
FIG. 13 is a perspective view of the alternate embodiment after being closed.
FIG. 14 is a cross-section of the fin insert having square convolutions.
Figure 15:
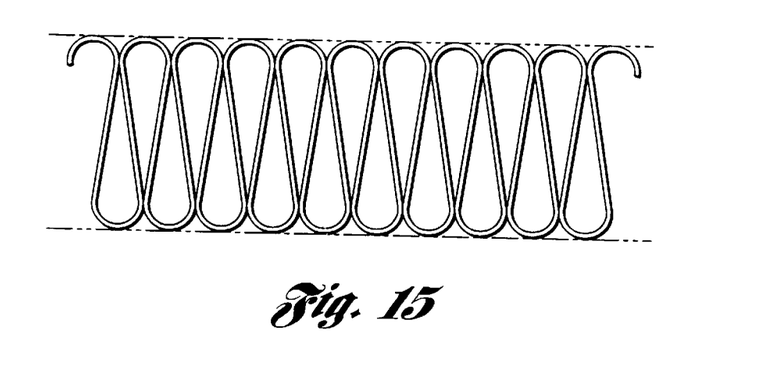
FIG. 15 is a cross-section of a fin insert having a tear-drop configuration.
Figure 16:
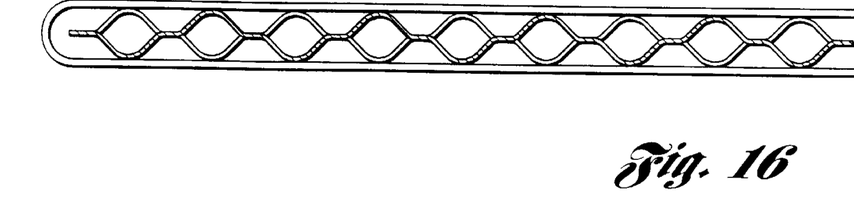
FIG. 16 is an end-view of an alternate embodiment of the tube in which a serrated insert is placed.
Figure 17:
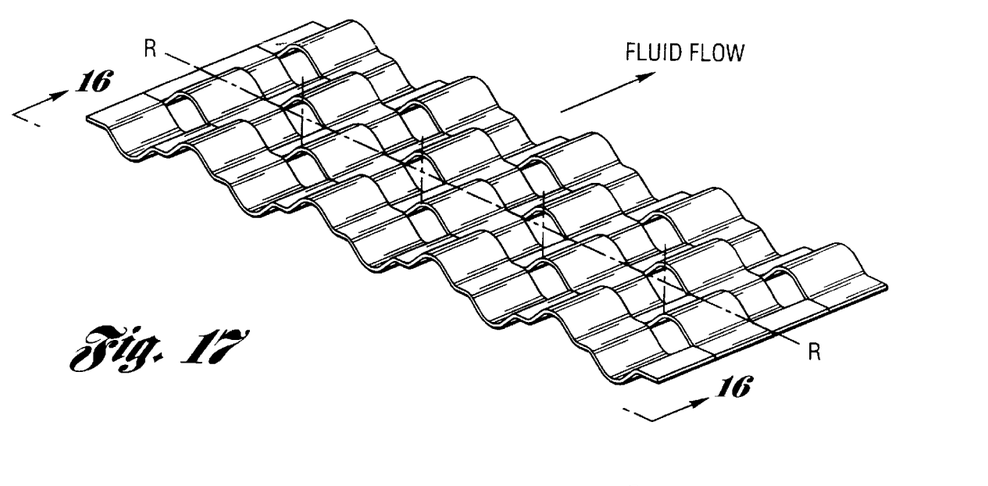
FIG. 17 is a perspective view of the insert depicted in FIG. 16, illustrating the direction of fluid flow thereacross and therethrough.
Figure 18:
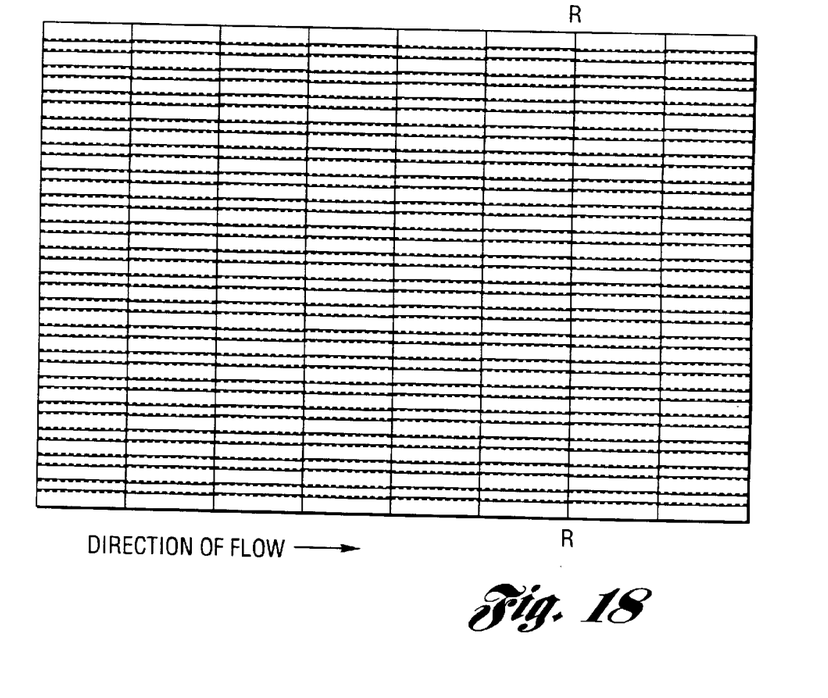
FIG. 18 is a part drawing of the insert depicted in FIGS. 16–17.

FIG. 2 shows a first embodiment of the tube 14. The tube has an outer metal shell 24 having an oblong cross-section. Enclosed within the metal shell 24 is an insert 26 such as a high density convoluted fin, which forms a plurality of fluid paths generally transverse to the longitude of the cooling tube 14. The insert 26 may have a simple convolute configuration as shown in FIG. 2, a square configuration as shown in FIG. 14 or an interlocking teardrop shape configuration in which adjacent sides of the convolutes touch each other as shown in FIG. 15, or a serrated configuration as depicted in FIGS. 16–18. Preferably, the high density insert 26 has 40 or more (e.g. 40–100) convolutes per inch. The insert 26 is centered and internally supported within the cooling tube 14 by a plurality of dimples 28 provided in the outer shell along opposite sides of the insert 26 as more clearly shown in FIGS. 3 and 9–10.

Figures 4, 5, 7:
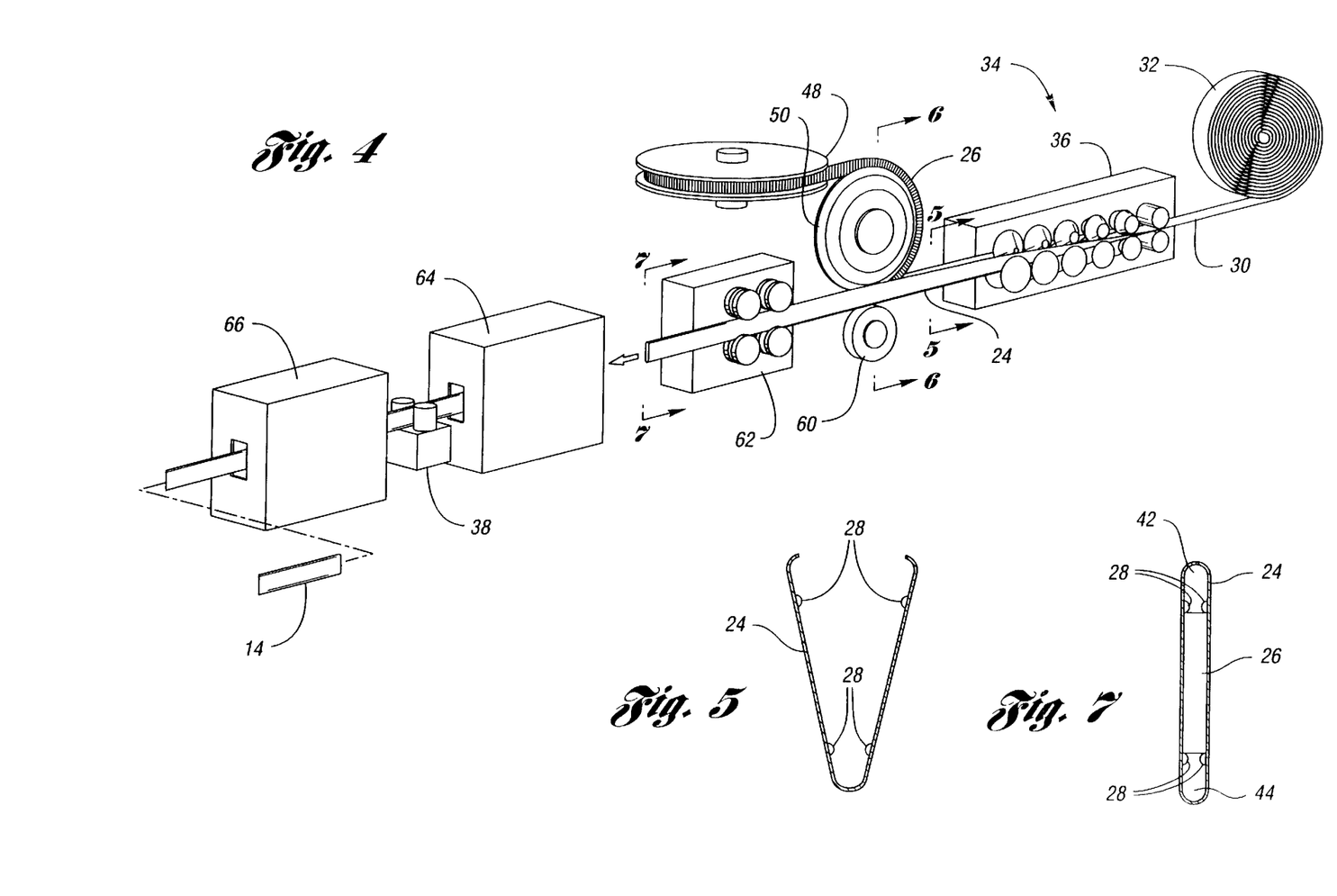
FIG. 4 is a schematic of the tube mill apparatus according to the invention.
FIG. 5 is a cross-section of the partially open shell, taken along section line 5—5 of FIG. 4.
FIG. 7 is a cross-section of a closed metal shell after heating, taken along section line 7—7 of FIG. 4.

The tube mill apparatus for making the cooling tube 14 is shown in FIG. 4 (preferred embodiment). Referring to FIG. 4, a metal strip 30 from which the outer shell of the tube 14 is to be made is received from a reel 32 and guided into a tube mill apparatus 34 such as taught by Wallis in U.S. Pat. No. 4,971,240. The tube mill apparatus 34 has a first plurality of rolls 36 which progressively form the metal strip 30 into the partially open clam shell form shown in FIG. 5. The apparatus 34 may also optionally include at least one set of dimple forming rolls for forming dimples in the shell 24 prior to placing the insert 26 into the metal shell 24. The dimples serve to position the insert, if desired, centrally in the width of the tube. In this manner, the insert does not touch the internal radius of the flattened oval edges of the tube so that a passage is created for fluid flow. The dimple forming roll may be the first roll in the tube mill apparatus 34 or the dimple forming function may be incorporated into any of the rolls of the first plurality of rolls 36.

Figures 9, 10, 11:
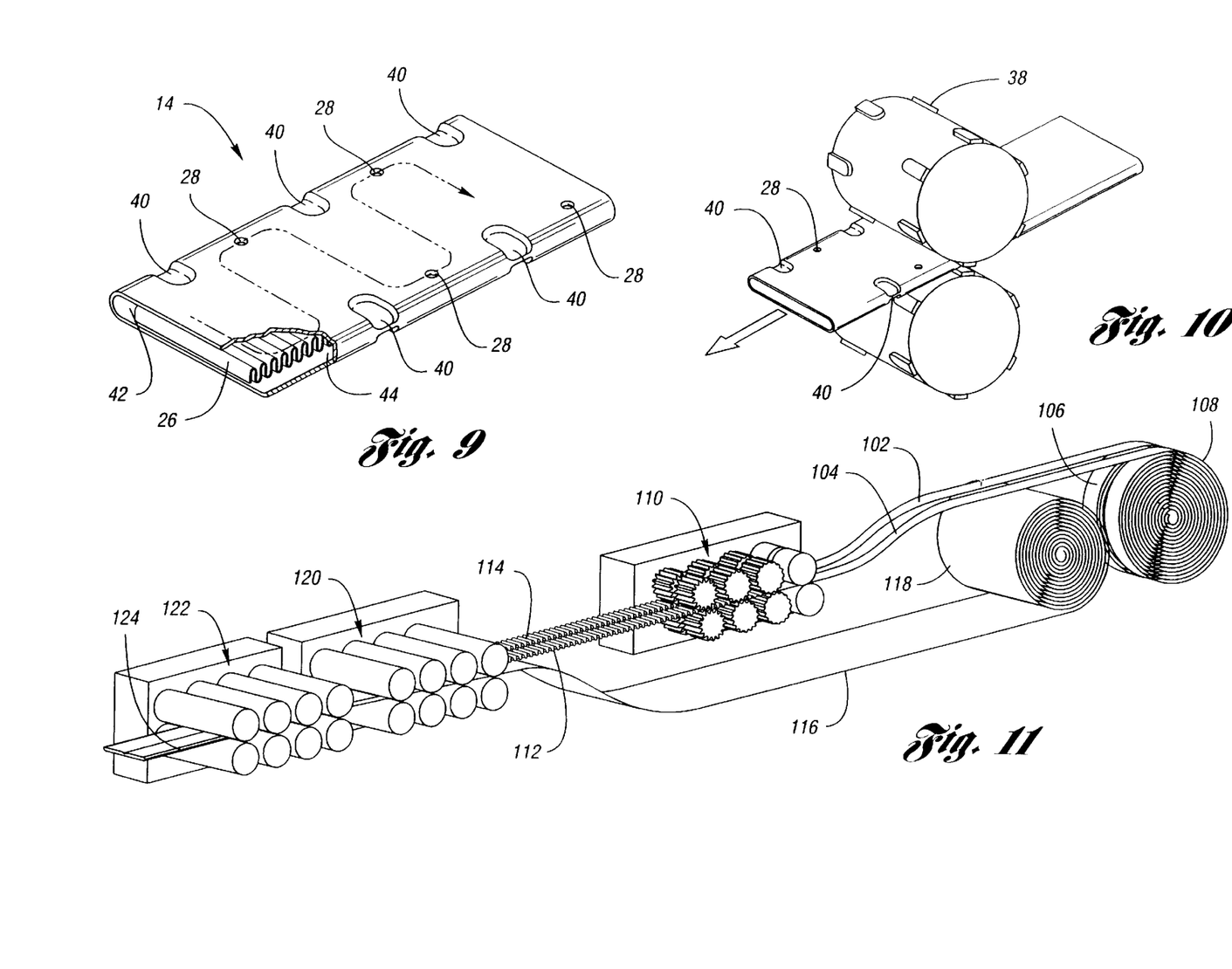
FIG. 9 is a perspective of a tube having dimples and detents.
FIG. 10 is a perspective of detent-forming rolls.
FIG. 11 is a perspective view of a tube mill apparatus for making the cooling tube of FIG. 12.

The dimple forming roll may also incorporate a punch or other equivalent means for imparting blocker detents 40 in the metal strip 30 at predetermined locations on opposite sides of the insert 26 along the length of the cooling tubes (FIG. 10). The blocker detents 40 block the longitudinal flow of the fluid along the longitudinal channels 42 and 44 respectively formed between the internal surfaces of the metal tube 14 and the sides of the insert 26 as shown in FIG. 9. The detents 40 formed along the opposite sides of the metal shell 24 are staggered relative to each other to produce a serpentine fluid path indicated by the arrow 46 stretching from one end of cooling tube to the other.

Figure 6:
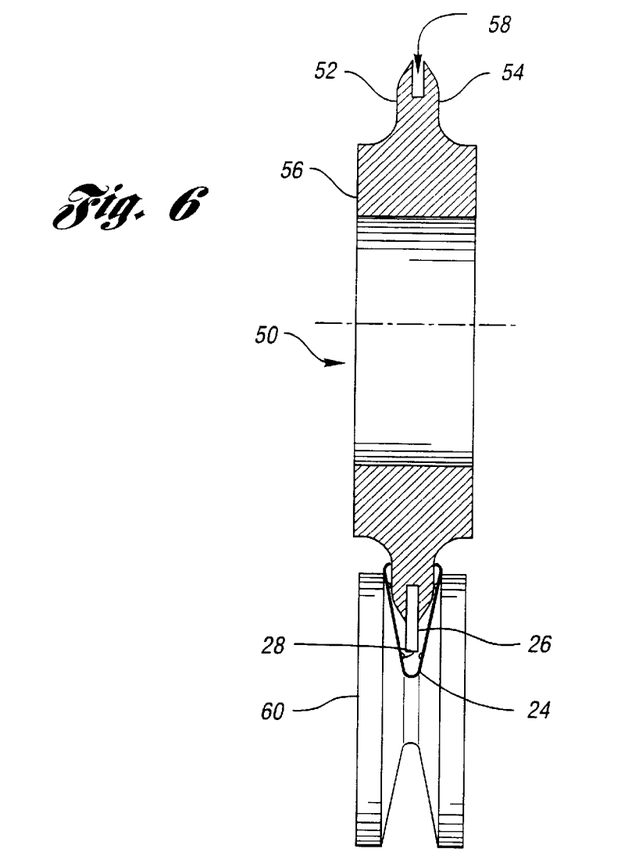
FIG. 6 is a cross-section of the fin insertion wheel, taken along section line 6—6 of FIG. 4.

Referring back to FIG. 4, a continuous high density fin insert 26 is retrieved from a reel 48 and is guided to an insertion wheel 50 (FIG. 6) which guides the fin insert 26 into the interior of the partially open metal shell 24 prior to being closed. The insertion wheel 50 as shown in FIG. 6 has a pair of truncated conical outer portions 52 and 54 extending radially from a cylindrical hub 56. The interior surfaces of the conical portions 52 and 54 form an annular slot 58 into which the fin insert 26 is received. The conical portions 52 and 54 engage and maintain the separation of the edges of the metal shell 24 so that the fin insert 26 is accurately guided into the interior of the metal shell 24 prior to the shell being closed. A guide roll 60 supports the partially open shell 24 during the insertion of the fin insert 26, as shown in FIG. 6. The dimples 28 at the bottom of the metal shell (FIG. 5) 24 support the insert 26 in its centered location until the shell is closed. After the fin insert 26 is placed within the metal shell, closing rolls 62 close the metal shell 24 and the dimples 28 engage the insert along opposite lateral sides and hold the insert in its desired location as shown in FIG. 7. Returning to FIG. 4, after the metal shell is closed by the closing rolls 62, the closed assembly is heated (preferably by an induction heater 64) to a temperature sufficient to braze or solder the lateral edges of the metal shell to each other and braze the insert 26 within the closed shell. After brazing, a cutter 66 cuts the brazed tube into desired lengths to form the individual cooling tubes 14.

Figure 8:
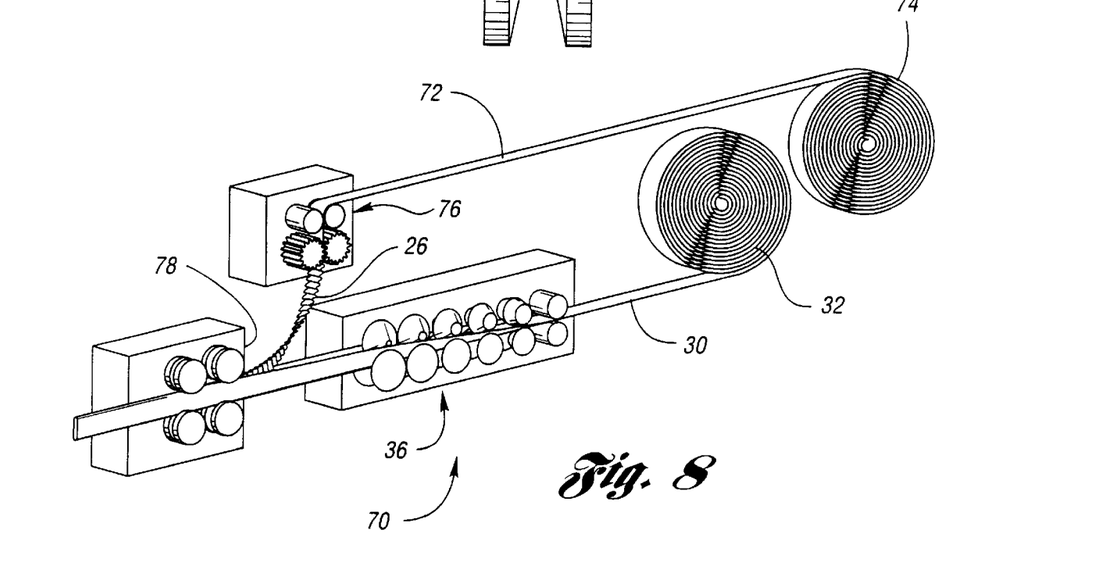
FIG. 8 is an alternate embodiment of the tube mill apparatus.

An alternative embodiment 70 of the tube mill apparatus 34 for making the cooling tubes 14 is shown in FIG. 8. As described above, a metal strip 30 from a roll 32 is fed into a tube mill apparatus 70 which forms the metal strip into the clam shell configuration as previously discussed.

A metal strip 72 from a reel 74 is formed into a continuous length of a high density convoluted fin 26 by a set of rolls 76. The high density fin 26 is convoluted to form fluid passages transverse to the length of the metal shell. The fin 26 is inserted into the partially open shell 24 prior to the shell being closed. An insertion wheel 78 comparable to insertion wheel 50 is again used to place the high density fin 26 into the partially open shell 24. Closing rolls (not shown) such as closing rolls 62 will again close the metal shell 24 with the fin 26 inside. A bonding device selected from group consisting of a heater, a controlled atmosphere brazer (cab), an induction welder, a soldering device, an ultra sonic welder, and the like generally indicated by the referenced 64 bond the closed metal shell to join the lateral edges of the metal shell to each other with the fin insert 26 inside. Forming rolls 36 form the metal strip 30 from a reel 32 into the outer shell 24 as previously discussed.

The metal strips 30 and 72 are preferably made from an aluminum alloy coated with a brazing material or a solder having a melting temperature below the melting temperature of the aluminum alloy. The thickness of the brazing material or solder layer is in the range from 10% to 20% of the thickness of the aluminum alloy. Coated metal strips as described above are readily available from several commercial sources. Although the preferred metal is an aluminum alloy, other coated metals which perform the same function are also commercially available and may be used to make the outer shell 24 and the insert 26.

FIG. 12 shows an alternate embodiment 80 of the cooling tube 14 for an automotive radiator. To make this embodiment, a coated metal strip 82 is folded to form two leafs 84 and 86 (FIG. 13) which are closed to form two parallel fluid channels 88 and 90. In these cooling tubes, inserts 92 and 94 comparable to insert 26 are disposed in each of the two fluid channels 88 and 90 forming a cooling tube 96 having two parallel fluid flow channels.

The tube mill apparatus 100 for making this embodiment is illustrated in FIG. 11. In this tube mill apparatus, two strips of coated metal 102 and 104 from reels 106 and 108 are guided through a first set of fin rolls 110 to form two parallel high density fin inserts 112 and 114 respectively.

A third coated metal strip 116 from a reel 118 is formed by a set of tube forming rolls 120 which incrementally form the metal strip 116 into the form shown on FIG. 12. Prior to folding the leafs 84 and 86 to the closed position the two high density fin inserts 102 and 104 are laid on the base portion 102 of the partially formed tubes as shown on FIG. 11. As discussed relative to the embodiment shown on FIG. 3, dimples, such as dimples 28, are used to centrally locate the fin insert 102 and 104 respectively in the two fluid flow channels 88 and 90. The tube closing roll 122 will then close the leafs 84 and 86. The tube with the inserted fin inserts 102 and 104 is then heated such as heater 64 (FIG. 4) to a temperature sufficient to braze or solder the longitudinal ends of the two leafs 84 and 86 to the base portion 82 and fuse the fin inserts 102 and 104 inside the fluid flow channels to form a continuous integral assembly 124. A cutter such as discussed earlier will then cut the continuous integral assembly 124 to form the desired cooling tube 80.

The pear-shaped, or tear-shaped form of insert (FIG. 15) defines closed chambers extending laterally in relation to the length of each flattened tube. These chambers tend to confine the molten clad so that it adheres to the walls of the tube and to the points of tangency between ridge lines of convulsions and the internal tube walls. The closed chambers serve to arrest the flow of molten clad away from the bonding site, thereby promoting strength and ability to withstand high internal pressures.

In some embodiment of the disclosed manufacturing apparatus or method steps, no dimples or spacing members are required to position the insert within the oval tube. For example, the insert may effectively be positioned by an interference fit therewithin. Alternatively, a physical separator, such as a spacer blade can be interposed below the insert as it is placed edgewise into the clam-shell tube before closure.

FIGS. 16-18 depict a serrated form of insert which has a component of resistance to flow in the form of ridges R—R (FIGS. 17-18) which lie orthogonally to the direction of fluid flow.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A method for making a tube for a heat exchanger comprising:
    forming, with a first set of rolls, a continuous metal shell from a metal strip, the metal shell having a closed longitudinal edge and a pair of partially open longitudinal edges;
    placing a continuous fin insert into the continuous metal shell, said fin insert being placed into the metal shell at a location intermediate said closed longitudinal edge and said pair of partially open longitudinal edges, the fin insert having a high density of convolutions extending in a direction transverse to the closed and partially open longitudinal edges; and
    closing the pair of partially open longitudinal edges of the continuous metal shell around the fin insert with a set of closing rolls to seal the metal shell, the closing of the pair of partially open longitudinal edges forming a sealed longitudinal edge, the sealed metal shell having a first internal longitudinal channel formed between the fin insert and the closed longitudinal edge and a second internal longitudinal channel formed between the fin insert and the sealed longitudinal edge.

2. The method of claim 1 further including slicing the sealed continuous metal shell with the fin insert fused inside to form a desired length of flattened tube.

3. The method of claim 1 further including imprinting dimples in the step of forming a continuous open shell, said dimples facilitating the placing fo the firm insert at said location inside said methal shell.

4. The method of claim 1 further comprising imprinting detents along the sides of the continuous shell, said detents alternately blocking the first and second internal longitudinal channels in a staggered sequence to define a serpentine fluid flow through the continuous shell.

5. The method of claim 1 further including the step of passing a second metal strip through at least one set of fin forming rolls to form the continuous fin insert.

* * * * *

UNITED STATES PATENT AND TRADEMARK OFFICE
CERTIFICATE OF CORRECTION

PATENT NO.    : 6,470,570 B2
DATED         : October 29, 2002
INVENTOR(S)   : Larry P. Prater and Richard P. Stoynoff It is certified that error appears in the above-identified patent and that said Letters Patent is hereby corrected as shown below:

<u>Column 6,</u>
Line 40, delete "fo" and insert -- of --
Line 41, delete "methal" and insert -- metal --

Signed and Sealed this

Fourth Day of March, 2003

JAMES E. ROGAN
*Director of the United States Patent and Trademark Office*